US012190250B2

(12) United States Patent
Seabolt et al.

(10) Patent No.: US 12,190,250 B2
(45) Date of Patent: Jan. 7, 2025

(54) CONTEXTUAL INTELLIGENCE FOR UNIFIED DATA GOVERNANCE

(71) Applicant: INTERNATIONAL BUSINESS MACHINES CORPORATION, Armonk, NY (US)

(72) Inventors: Edward E. Seabolt, Williamson, TX (US); Eser Kandogan, Mountain View, CA (US); Mary A. Roth, San Jose, CA (US); Harsha V. Krishnareddy, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 1268 days.

(21) Appl. No.: 16/002,394

(22) Filed: Jun. 7, 2018

(65) Prior Publication Data
US 2019/0287032 A1 Sep. 19, 2019

Related U.S. Application Data

(60) Provisional application No. 62/643,871, filed on Mar. 16, 2018.

(51) Int. Cl.
*G06N 5/022* (2023.01)
*G06F 16/23* (2019.01)
(Continued)

(52) U.S. Cl.
CPC ......... *G06N 5/022* (2013.01); *G06F 16/2379* (2019.01); *G06N 3/08* (2013.01);
(Continued)

(58) Field of Classification Search
CPC .......... G06N 5/022; G06N 3/08; G06N 5/025; G06N 20/00; G06F 16/2379; G06F 16/9024
(Continued)

(56) References Cited

U.S. PATENT DOCUMENTS 6,138,117 A 10/2000 Bayardo
6,829,608 B2 12/2004 Ma et al.
(Continued)

OTHER PUBLICATIONS

Destefano, 2016, "Improving Enterprise Data Governance Through Ontology and Linked Data" (Year: 2016).*
Boden et al., 2017, "PEEL: A Framework for Benchmarking Distributed Systems and Algorithms" (Year: 2017).*
Wang, 2015, "Collaborative Deep Learning for Recommender Systems" (Year: 2015).*
(Continued)

*Primary Examiner* — Abdullah Al Kawsar
*Assistant Examiner* — Jun Kwon
(74) *Attorney, Agent, or Firm* — Anthony M. Pallone

(57) ABSTRACT

An embodiment of the invention may include a method, computer program product, and system for unified data governance. The embodiment may include populating a context graph with to-be-governed data, by a machine learning framework in communication with a suite of enterprise application servers via one or more connector components. The to-be-governed data is retrieved from the suite of enterprise application servers. The embodiment may include training a plurality of machine learning models using the context graph and the to-be-governed-data based on user-defined parameters. The embodiment may include persisting properties of the plurality of machine learning models back to the context graph.

14 Claims, 8 Drawing Sheets

(51) Int. Cl.
*G06F 16/901* (2019.01)
*G06N 3/08* (2023.01)
*G06N 5/025* (2023.01)
*G06N 20/00* (2019.01)

(52) U.S. Cl.
CPC ......... *G06N 5/025* (2013.01); *G06F 16/9024* (2019.01); *G06N 20/00* (2019.01)

(58) Field of Classification Search
USPC .......................................................... 706/12
See application file for complete search history.

(56) References Cited

U.S. PATENT DOCUMENTS

| | | | |
|---|---|---|---|
| 8,005,870 | B1 | 8/2011 | Bedell et al. |
| 9,390,450 | B1* | 7/2016 | Hart .................... H04L 67/1097 |
| 2009/0006398 | A1* | 1/2009 | Lam ........................ G06Q 30/02 |
| 2014/0032273 | A1* | 1/2014 | D'Angelo .............. G06Q 30/02 705/7.35 |
| 2014/0149422 | A1* | 5/2014 | Sadler .................... G06Q 50/01 707/741 |
| 2016/0026438 | A1* | 1/2016 | Wolfram .................. G06F 8/60 717/109 |
| 2017/0004279 | A1* | 1/2017 | Pingali .................. G16H 50/50 |
| 2017/0039246 | A1* | 2/2017 | Bastide .................. G06Q 50/01 |
| 2017/0262502 | A1 | 9/2017 | Rastunkov et al. |
| 2017/0308595 | A1* | 10/2017 | Dey ...................... G06F 16/283 |
| 2017/0344592 | A1* | 11/2017 | Sundaram ............. G06F 16/256 |
| 2017/0364534 | A1* | 12/2017 | Zhang ...................... G06N 5/04 |
| 2018/0276218 | A1* | 9/2018 | Pidaparthi ............. G06F 21/552 |
| 2018/0365036 | A1* | 12/2018 | Toal ..................... G06F 9/44578 |
| 2019/0213099 | A1* | 7/2019 | Schmidt ................ G06F 9/5083 |

OTHER PUBLICATIONS

Pazzani & Billsus, 2007, "Content-Based Recommendation Systems" (Year: 2007).*
Alation, "New Gartner Report: Data Catalogs Are the New Black in Data Management Analytics," Alation, The First Data Catalog Designed for Collaboration, https://alation.com/, Printed on Mar. 15, 2018, pp. 1-8.
EScience Institute, "Sqlshare," https://rest.sqlshare.uw.edu/accounts/login/?next=/o/authorize/%3Fresponse_type%3Dcode%26client_id%3DyGVPzLCyk4D62SofYYOAu52CZsUYfOulvVsCX6Qv, Printed on Mar. 15, 2018, pp. 1-2.
Han et al., "Mining Frequent Patterns without Candidate Generation," Proceedings of the 2000 ACM SIGMOD International Conference on Management of Data (SIGMOD '00), Dallas Texas, USA, May 15-18, 2000, pp. 1-12.
Khoussainova et al., "SnipSuggest: Context Aware Autocompletion for SQL," The 37th Conference on Very Large Databases, Aug. 29-Sep. 3, 2011, Seattle, Washington, Proceedings of the VLDB Endowment, vol. 4, No. 1, Copyright 2010 VLDB Endowment, pp. 22-33.
Ma et al., "Improving Recommender Systems by Incorporating Social Contextual Information," The Chinese University of Hong Kong, ACM Trans. Inf. Syst. 29, 2, Article 9 (Apr. 2011), DOI = 10.1145/1961209.1961212 http://doi.acm.org/10.1145/1961209.1961212, pp. 1-23.
Pasquier et al., "Discovering Frequent Closed Itemsets for Association Rules," In Proceedings of the 7th Interna-ional Conference on Database Theory (ICDT '99), Jan. 10-12, 1999, Springer-Verlag, London, UK, pp. 1-19.
Marcel et al., "A survey of query recommendation techniques for datawarehouse exploration," In Actes des 7èmes journées francophones sur les Entrepôts de Données et l'Analyse en ligne, Clermont-Ferrand, France, EDA 2011, Jun. 2011, pp. 1-16.

* cited by examiner

Database Table Details

[ Edit ] [ Delete ] [ Add to Collection... ] [ Copy ]

AUTHOR

Context: IGC.SL.CLOUD9.IBM.COM » PUBS » SCHEMA_1143

▼ Recommendations (6)

1-6 of 6      List Options ▼

| Related Table Name | Reason | Score |
|---|---|---|
| HR_VIEW | Shares 2 terms: AUTHOR, PERSON | 0.94444 |
| TWITTERMAT | Shares 2 terms: AUTHOR, PERSON | 0.94444 |
| TWITTER | Shares 2 terms: AUTHOR, PERSON and Used in 9 queries | 0.94444 |
| FREE_RIDERS | Shares 2 terms: AUTHOR, PERSON and Used in 2 queries | 0.94444 |
| TBL_PERSON | Shares 1 term: PERSON and Used in 1 query | 0.58333 |
| AUTHORED | WARNING - This table is used in 44 queries but is not managed by IGC | N/A |

SQL Query:

- select a.fullname from schema_1143.author a, schema_1143.authored b where a.fullname =
- a.fullname = b.fullname - (34)
- a.fullname - (32)
- b.pubid = p.id - (32)
- schema_1143.inproceedings p - (31)

Recommendations:

| Item | Reason | Conf |
|---|---|---|
| x² count() | count() was used in context with a.fullname, schema_1143.author a, schema_1143.authored b | 1.00 |
| a.fullname = b.fullname | a.fullname = b.fullname was used in context with a.fullname, schema_1143.author a, schema_1143.authored b | 1.00 |
| b.pubid = p.id | b.pubid = p.id was used in context with a.fullname, schema_1143.author a, schema_1143.authored b | 0.90 |
| schema_1143.inproceedings p | schema_1143.inproceedings p was used in context with a.fullname, schema_1143.author a, schema_1143.authored b | 0.90 |
| c | c was used in context with a.fullname, schema_1143.author a, schema_1143.authored b | 0.61 |
| a.fullname in fullname | a.fullname in fullname was used in context with a.fullname, schema_1143.author a, schema_1143.authored b | 0.16 |
| schema_1143.article p | schema_1143.article p was used in context with a.fullname, schema_1143.author a, schema_1143.authored b | 0.13 |
| p.booktitle = 'UBICOMP' | p.booktitle = 'UBICOMP' was used in context with a.fullname, schema_1143.author a, schema_1143.authored b | 0.10 |

FIG. 6

CONTEXTUAL INTELLIGENCE FOR UNIFIED DATA GOVERNANCE

BACKGROUND

Embodiments of the invention generally relate to artificial intelligence, and more particularly to applications of artificial intelligence to data management and data governance systems.

Data governance generally refers to data management according to a set of policies and procedures. Individuals, organizations, and governments are generating and retaining an increasing amount of data that, absent proper data governance, can be lost, corrupted, or improperly divulged.

Therefore, there is a general need for data governance systems that address modern challenges of big data. One way of improving data governance systems is to infuse them with artificial intelligence (AI) capabilities.

SUMMARY

An embodiment of the invention may include a method, computer program product, and system for unified data governance. The embodiment may include populating a context graph with to-be-governed data, by a machine learning framework in communication with a suite of enterprise application servers via one or more connector components. The to-be-governed data is retrieved from the suite of enterprise application servers. The embodiment may include training a plurality of machine learning models using the context graph and the to-be-governed-data based on user-defined parameters. The embodiment may include persisting properties of the plurality of machine learning models back to the context graph.

BRIEF DESCRIPTION OF THE SEVERAL VIEWS OF THE DRAWINGS

FIG. 5 illustrates an example graphical user interface (GUI) 500 for discovery and compliance, according to an embodiment of the invention.

FIG. 6 illustrates an example GUI 600 for a query assist function, according to an embodiment of the invention.

DETAILED DESCRIPTION

Figure 1:
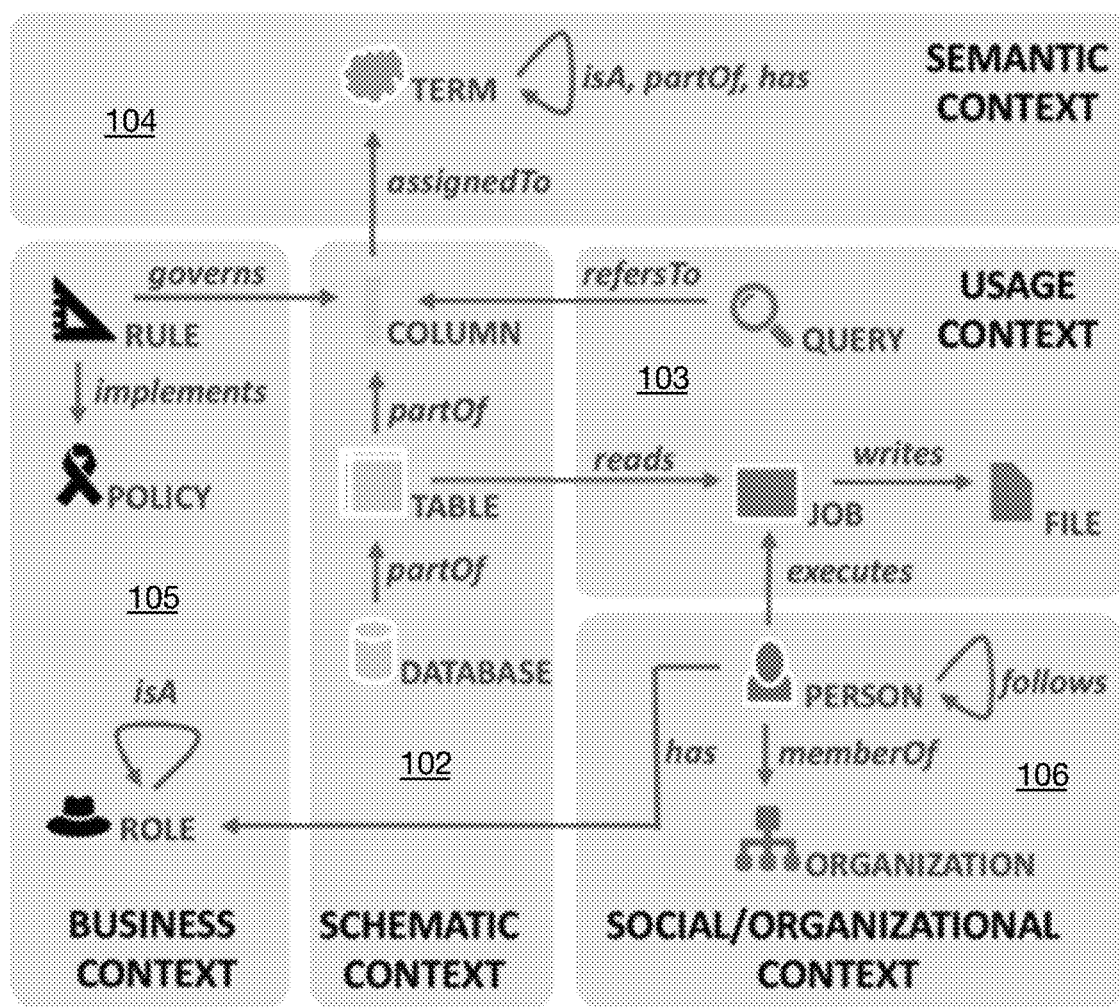
FIG. 1 is a functional block diagram of a contextual graph 100, according to an embodiment of the invention.

Much of the current research on applications of AI techniques to data management and data integration technology has focused on developing algorithms and systems that facilitate processing of very large data sets. However, users of enterprise data management systems point to another important characteristic of these data-intensive problems, one that has received far less attention with respect to applying AI: establishing trustworthiness and maintaining a robust governance program over the data managed by such large-scale systems. Data governance techniques today are typically implemented by teams of data stewards who follow business processes to implement governance policies, relying on best practices and word-of-mouth knowledge to locate valuable data to be governed, define the appropriate policies, and ensure they are being followed. This practice is very labor intensive, and by definition, prone to error. Furthermore, current practices do not scale to the increasingly complex and diverse data ecosystems in the enterprise, with an increasing number of data sources, requirements, use cases, applications, and systems coming into play every day.

Embodiments of the invention, on the other hand, generally provide techniques from artificial intelligence and machine learning that have the potential to facilitate governance in data-driven enterprises. One consideration is to create an accurate and holistic source of data use to facilitate machine learning. A significant advantage of a graph-based knowledge repository that captures different types of metadata is that it can be a repository for a broad class of problems and it provides a flexible platform to combine different approaches for search and recommendations. For example, an analytics layer may be built over this context graph to support contextual search and recommendations, provenance exploration, and activity summarization to help improve information quality. Embodiments of the invention add to this functionality by using a machine learning approach that supports and enables data governance to improve discoverability, quality and compliance.

Some embodiments of the invention may, but need not, provide some or all of the following features and advantages: (1) they identify challenges of data governance in data-driven enterprises, as open socio-technical systems, as opposed to closed systems, overseeing large amount of data, people, and systems in the enterprise; (2) they recognize data governance as a big data and analytics problem, and hence call for artificial intelligence and machine learning techniques to properly address them; (3) they model governance context as a property graph that is fed from large number of enterprise systems and contribute recommendations back into the same systems; and (4) they propose a blueprint of a reference architecture that supports analytics and machine learning over such a contextual graph in support of governance capabilities.

In the following discussion, at least three challenges present in today's best practices in data governance will be discussed to contextualize approaches to solving them in embodiments of the invention. Additionally, a unifying governance platform will be described based on a contextual metadata graph and declarative machine learning framework. A data governance architecture will also be presented, and its operation will be demonstrated using two use-cases.

Challenges—

Due to the increasing importance of data as a key differentiator in enterprise operations and solutions, a general public concern on data rights, privacy, and security, and regulations such as GDPR and HIPAA; data-driven enterprises are increasingly feeling pressure to adopt stricter governance processes and policies in order to bring transparency with regard to the use of data throughout the enterprise. In fact, such pressures have given rise to the "Chief Data Officer" function becoming as a C-level executive to oversee all data practices in an enterprise. As a consequence, three capabilities often emerge as key requirements:

a. Discovery, to ensure that assets could be easily located, searched, and linked to relevant assets;
b. Quality, to ensure that appropriate high-quality data assets are used for the right purposes; and
c. Compliance, to ensure that assets are monitored, enforced and audited for compliance with regulations.

These governance challenges are to a large degree unmet by today's data management and governance platforms; or are only addressed in a piecemeal fashion. For example, current approaches in information quality typically focus on techniques to measure the quality of the data content but not the context of its use. While results of data profiling do provide some valuable information about the format of the data, who uses that data—and for what business purpose—is also invaluable information to establish the quality and appropriateness of the data for a new purpose; the latter is missing from current solutions.

Similarly, compliance with governance policies can be challenging due to the rate at which data comes into the enterprise and speed with which regulations change. Inventors of the present application have observed, in their study of business analysts, data stewards, and data compliance officers of several Fortune 500 companies, a striking frequency, strength and commonality with which so many of the users experienced challenges and expressed similar cries for help, regardless of business domain.

Common across these challenges is the recognition that contextual metadata on how data assets are accessed, by whom, and for what purposes can be as important as the content of the data asset. If such contextual metadata can be captured and linked to data assets and users of those assets, the result is a context-rich metadata source that can be exploited using artificial intelligence and machine learning techniques to achieve contextually intelligent data governance. AI techniques are particularly well-suited to address these challenges by learning from past usage of the data by users.

Recent estimates indicate that 70% of the time that it takes to build an application is spent on data preparation tasks. A key challenge is often discovery or knowing where to start. Users often speak of leveraging 'tribal knowledge', i.e., help from experts in the enterprise who not only have access to the data assets, but also have unique insights to identify what data is appropriate for a particular business context and knowledge of the underlying assumptions in data, and can thus guide data analysis, and help interpret results. Tribal knowledge fuels a sustainable collective insight.

The ability to quickly find relevant and trustworthy expertise and assets to reuse and re-purpose is important. For example, what is missing from the typical corporate directory of "experts" is the context around why the experts are experts, what thought processes led them to solve a business problem or achieve a result, and what other insights they may have learned along the way. While the directory may lead one to interview the expert to learn that information, such an approach is neither scalable nor robust. Memories fade and experts leave the organization, taking their organizational knowledge with them. Similarly, a catalog of data assets lacks the context by which to establish the true value of the asset; it is important to know how and who used an asset and for what purpose in order to know how useful and relevant that asset is for a new purpose.

Today, tribal knowledge exists, but it is not captured in any one place; it is passed down by word of mouth, resides in old emails or collaboration platforms, such as wiki pages. Likewise, usage data that describes how assets are used, by whom and for how long is implicitly captured in the multitude of logs of software and tools that users employ as part of their work activities, but in their present form they are hard to extract and re-purpose. Likewise, social metadata that describes how groups of people are related exist in many social and networking tools, but they are not linked to assets, projects, people, and other resources.

At the simplest level, an asset used by an expert or someone personally trusted might need to be ranked more highly in a search result compared to an asset with no association to anything, or worse, with association to someone of ill repute. At a minimum, establishing relevance and trustworthiness of a data asset requires connecting user profiles and social network information of those users to the catalogs that describe the structure and meaning of the asset to the system logs that describe the use of that asset; in other words, collecting and connecting usage, social, schematic and semantic information is critical to support discovery.

Likewise, current information quality approaches can be used to classify data columns and to define data rules that can be executed on a regular basis to govern their values, and to enable the ability to define governance policies. However, in today's suite of information management tools, there is typically no association between policy definition of policies and the actual execution of the data and business rules that make up that policy; data stewards manually inspect data to identify and set governance policies. Additionally, as the rate of new data making its way into the enterprise increases, many assets escape the attention of the compliance officers. Furthermore, there is often no easy way to ensure that the users of the platform are actually using the data governed by data rules; the inventors of the instant Application have observed that data stewards often have difficulty determining that the data sources that are governed are actually the ones in use, and they are often surprised that the most popular data sources are not governed at all.

In summary, the ability to connect information quality to usage information and semantics would enable powerful opportunities to automate the monitoring, enforcing and auditing activities required for a governance program, thus facilitating an environment in which a higher level of compliance is more easily achieved. Once connected, contextual metadata can help to quantify the trustworthiness of an asset, and the absence of such connections can enable proactive enforcement of policies. Furthermore, such connections naturally provide the provenance information needed to audit the steps taken to produce a particular result.

Architecture.

Some embodiments of the invention may be directly created within the architecture of an information server that includes a suite of integrated products that, among other features, support information quality, enterprise search and data governance, and information integration. While many of such tools offer search capabilities that allow users to find information and assets of interest, results are often isolated to assets only known within the tool itself and are not connected to how data is used in other tools and by other users, either within the information server suite, or with outside tools. For example, a search within a given information governance catalog (IGC) may return results only for assets listed in the IGC, and a search within a particular analytics tool only returns results accessible by the user conducting the search within that analytics tool. Typically, users do not have a complete picture, nor do they have all the information they need to conduct a thorough search of assets used across an enterprise. This is particularly true of users in charge of data governance and compliance such as Chief Data Officers, who need mechanisms to discover assets and enforce compliance across tools in order to define policies and enforce business rules across the enterprise.

Accordingly, a key goal of some embodiments of the invention may be to provide a governance layer across these products to create a centralized representation of all governance related activities, linking every person, asset, tool and application, and the context around them.

Some embodiments of the invention may model governance context as a property graph feeding from a large number of sources typically present in an enterprise. The unified governance architecture populates this graph through source-specific connectors that publish to a queue to be stored into the context graph. To enable analytics over contextual metadata at such scale, a declarative machine learning framework may be introduced to flexibly derive features from the graph, feed data to machine learning algorithms, and populate results back to the graph in a manner such that they can be utilized subsequently for personalized search, recommendations and other uses.

Some embodiments of the invention will now be described in connections with the Figures, to illustrate the following aspects of the invention: (1) a context graph 100 (FIG. 1); (2) a unified governance architecture 200 (FIG. 2) to populate context graph 100; and (3) a contextual intelligence machine learning framework 300 (FIG. 3) to exploit context graph 100 for data governance.

Referring now to FIG. 1, a functional block diagram of a contextual graph 100 is provided, according to an embodiment of the invention. In the depicted embodiment, context graph 100 is a central component of the depicted governance architecture. It captures all activity related to data assets from a variety of systems and applications, with activity data coming in at different scale and speed. It drives large-scale machine learning and provides contextual data and services, such as search and compliance recommendations. Context graph 100 supports an expressive graph language, efficient search and query, and transactions.

Context is a complex concept. Research on context suggests that context is a relation between entities involved in the activity. Context does not have a boundary, but rather, an extent; that is, it is not whether something is in context or not, it is about how close it is. This requires that a representation of context must capture relations, attributes of such relations, and the various ways in which entities are related to each other. As such, in the depicted embodiment, context is represented as a property graph in order to accurately and completely represent relationships between entities that are directly or indirectly related through several edges on a path. A property graph fits these needs very well as they are attributed, directed, and multi-relational. The schema of a property graph is flexible in that it can evolve over time; both nodes and edges can have an arbitrary number of simple key/value-based attributes, with many types of edges between nodes.

With continued reference to FIG. 1, the entities represented in the graph are assigned basic attributes such as UID, preferredLabel, description, etc., and relationships such as ownedBy. Context graph 100 also supports user-defined entities, attributes, and relationships. Broadly, context graph 100 contains entities and relationships that capture schematic context 102, usage context 103, semantic context 104, business context 105, and social and organizational context 106.

The five contexts defined in context graph 100, in the exemplary embodiment described above, may be defined as follows: (a) schematic context 102 describes how data is structured, and includes entities such as Database, Table, and Column, and relations such as partOf; (b) usage context 103 captures activity on data, e.g., ETL jobs and queries that consume and produce data, through entities such as Query, Job, with relations such as refersTo, reads and writes; (c) semantic context 104 captures the meaning of data, through entities such as Term and ontological relations such as isA, partOf, and has; (d) business context 105 captures the practices of a business unit through its roles, processes, data and business rules and governance policies, represented by entities such as Role, Policy, and Rule, and relations such as has and implements and governs; and (e) social and organizational context 106 captures relationships between people, e.g., people following each other, being part of organizations, via entities such as Person and Organization, and relations such as memberOf and follows. Note that only a sample of possible entities and relations are represented in context graph 100; the actual number of entities and relationships can be in the hundreds, reflecting the complexity of data governance in an enterprise. A strength and advantage of the graph representation is that it enables a flexible representation of complex relationships that can be customized and evolve.

Contextual metadata captured in such a graph can be harnessed to address the data governance challenges discussed above. For example, the graph can be leveraged for discovery purposes to find related entities by analyzing co-occurrence of tables in queries and jobs derived from usage information. Likewise, semantic context can be leveraged to find related entities through business terms mapped to assets. Before discussing some of these links in more detail (which will be done below when discussing recommendations for governance), some mechanisms for populating context graph 100 will be described with reference to FIG. 2 and a multitude of systems and applications that typically make up an enterprise information management platform.

Figure 2:
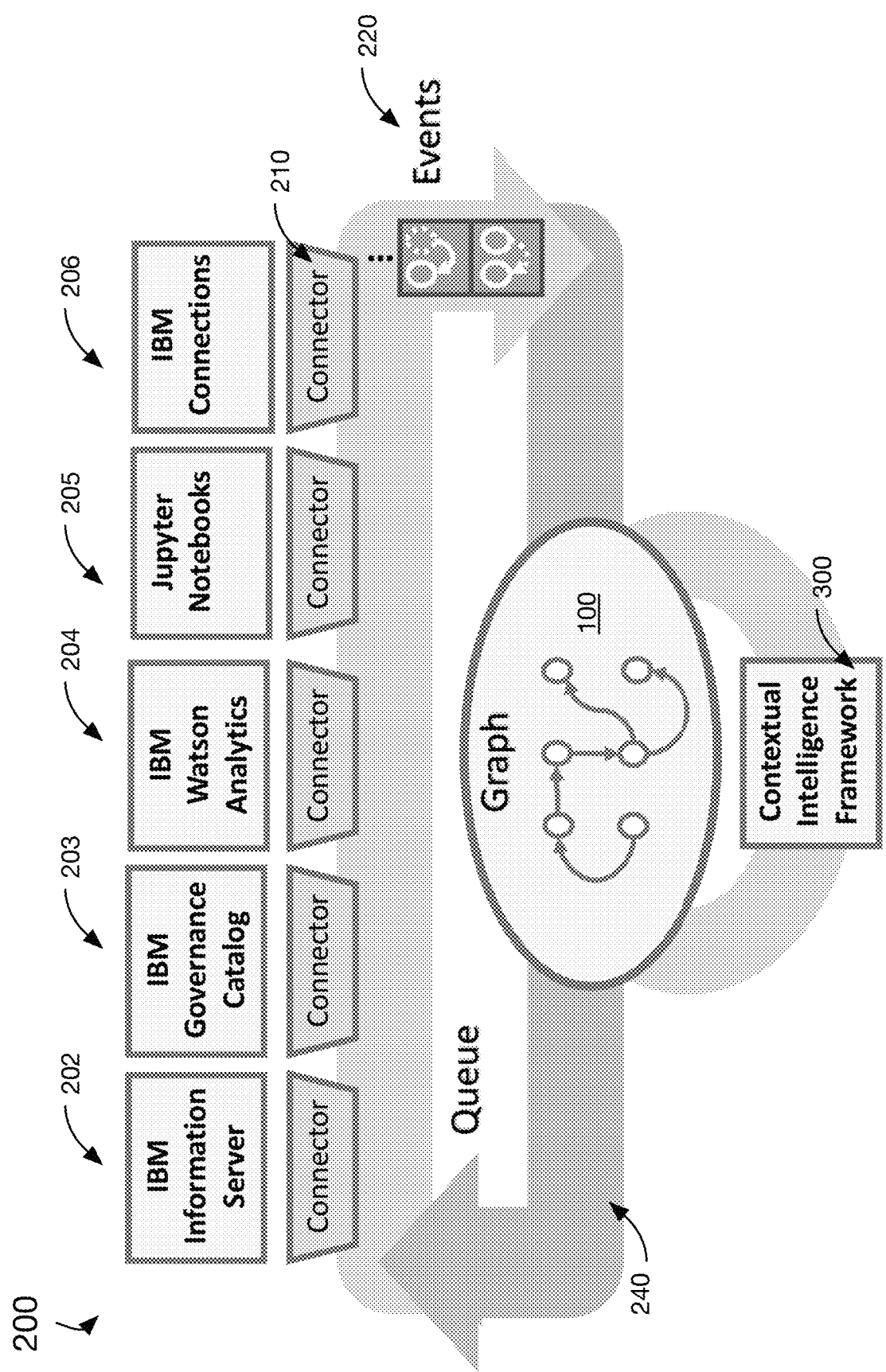
FIG. 2 is a functional block diagram of a unified governance architecture 200, according to an embodiment of the invention.

FIG. 2 is a functional block diagram of a unified governance architecture (UGA) 200, according to an embodiment of the invention. Referring now to FIGS. 1 and 2, a mechanism for populating context graph 100 (FIG. 1) is provided. In order to be useful, context graph 100 can be populated with metadata from a multitude of enterprise tools, repositories and applications to create a single integrated view that accurately represents data-related activities across users, and to drive analytics that provide contextual intelligence for governance purposes. As such, some aspects of the architecture for populating context graph 100 are: (1) an extensible connectors framework 210 that facilitates ingestion of governance-related metadata from systems and applications; (2) a queuing mechanism 240 to decouple systems from governance and to provide efficiency; and (3) machine learning framework 300 to provide contextual governance intelligence, driven by data from the graph and enriching graph with new discovered entities and relations.

Referring now to FIG. 2, UGA 200 is shown as a system augmented by a suite of tools that make up IBM Information Server 11.7 with a context graph and contextual intelligence framework to support data governance. The framework is flexible enough to include products from both inside and outside the suite. For example, IBM®InfoSphere Information Governance Catalog (IGC) is an important governance product within the suite. It can be used by data officers and data stewards to create and manage business assets, track usage, and apply policies and rules to enforce compliance. As such, it is a valuable source to feed context graph 100 with business context metadata. As another example, IBM Watson Analytics is a product outside the IBM Information Server suite that enables business users to query data naturally, create visualizations, and perform analytics. Thus, it can feed context graph 100 with important usage metadata. Likewise, IBM Connections is a collaboration suite that can feed the graph with social network metadata such as social connections between people, organizational hierarchy, etc. To populate the graph with data from all these systems, connector framework 210 may be adapted for a variety of sources to populate the graph. Some connectors 210, such as IGC, leverage REST APIs, while others utilize text analytics techniques to extract data from systems logs. According to an embodiment, output from connectors 210 are a set of instructions that update context graph 100 with new entities and relations by publishing events 220 to queue 240, implemented using Apache Kafka. (Trademarks referenced in this paragraph are the property of their respective owners).

Figure 3:
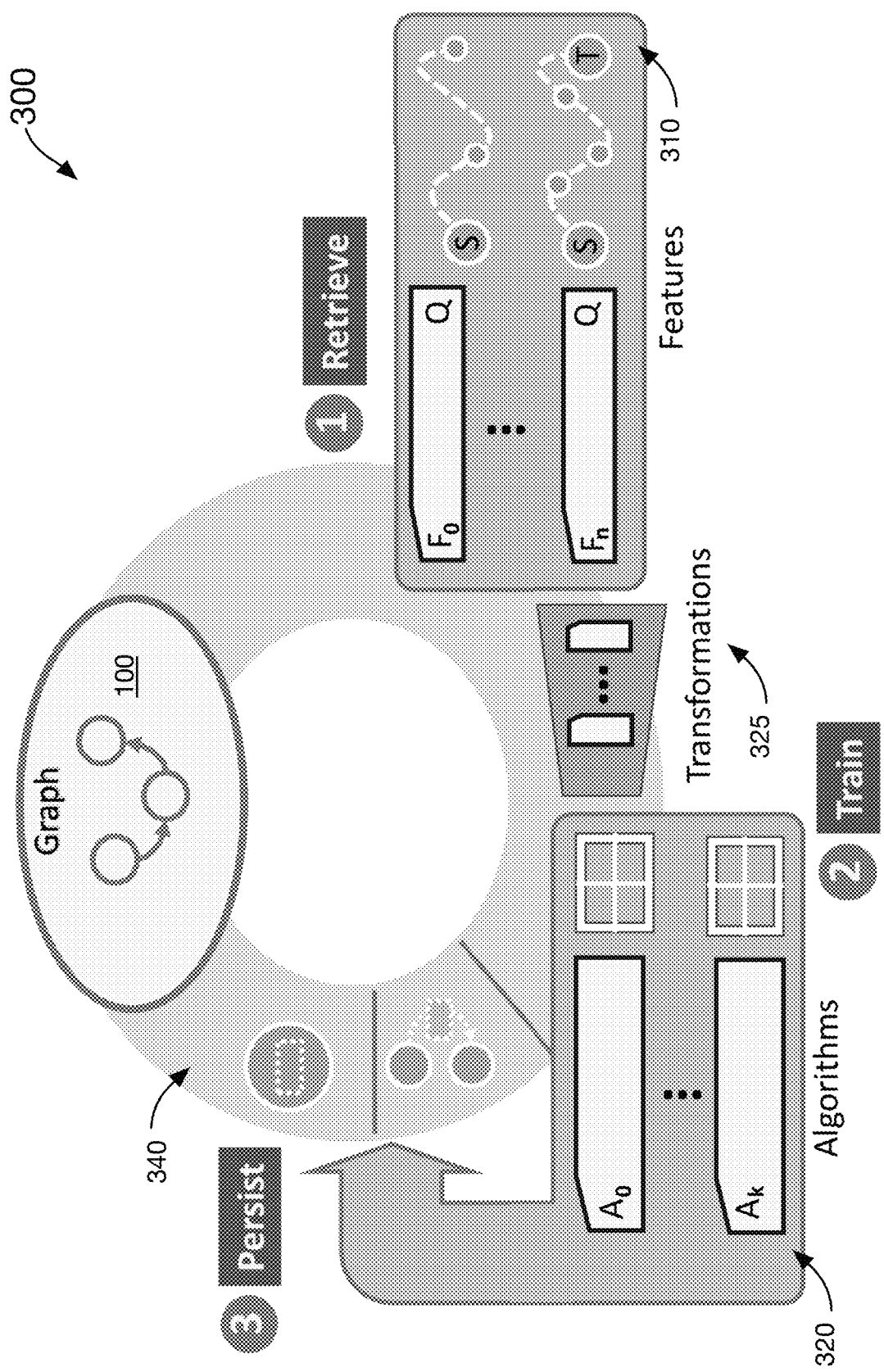
FIG. 3 is a functional block diagram of a declarative machine learning framework 300, according to an embodiment of the invention.

FIG. 3 is a functional block diagram of a machine learning framework 300, according to an embodiment of the invention. Referring now to FIGS. 1 and 3, machine learning framework 300 generally provides functions for exploiting context graph 100 (FIG. 1). Once populated, context graph 100 provides a rich source of data to facilitate AI and machine learning to enable unified governance. Described herein is a machine learning framework 300 that operates over context graph 100 and enables features such as personalized search, and recommendations to support governance and compliance.

Machine learning framework 300, according to an embodiment of the invention, is flexible enough to support a wide-variety of needs, from supporting governance compliance to recommending quality data assets. While context graph 100 helps in terms of representing a wide-range of governance related activities and data, machine learning framework 300 provides flexibility in terms of the type of analytics to be performed over context graph 100. Accordingly, a declarative approach to specifying machine learning pipelines over context graph 100 is provided. This allows easy experimentation with machine learning models where graph queries can retrieve data to extract features, transformations and algorithms can be flexibly defined to train models and test them, and when satisfactory, results can be persisted back to context graph 100 to augment governance context, with discovered nodes, relations, and attributes.

The disclosed declarative machine learning framework 300 treats context graph 100 as a first-class citizen and provides a no-compile time component using a declarative syntax for constructing ML pipelines. According to an embodiment, machine learning framework 300 may be built on top of Apache Spark version 2.1.0. Human-Optimized Config Object Notation (HOCON) may be used for the basis of the declarative syntax, as it provides a more human editable format than others (e.g. JSON, XML). HOCON provides additional capabilities such as comments, variables, and modularization giving ML pipeline authors more flexibility, organization, and management of their configurations. The disclosed declarative specification may have three major parts that are outlined in detail below.

Datasource—

A datasource 310 provides the method for reading data and preparing it for use in a pipeline. In addition to graph data source 310, machine learning framework 300 may support data in plain text, CSV, and JSON formats to facilitate use of any auxiliary data. Graph data source 310 can declare one or more configuration elements that specify a query, an optional post query script written in Javascript, an optional post query pipeline, and the schema describing the data. The following snippet (provided in TABLE 1) shows an example of the declarative data source configuration. This example builds a simple data source 310 from all queries capturing the user, the user's role, and issued query text, by selecting the PREFERRED LABEL attribute from all entities of type USER andROLE, and selecting QUERY TEXT from QUERY.

TABLE 1

Example of Declarative Data Configuration

```
dataSource = {
  type = "com.ibm.labbook.ml.spec.datasource.GraphDataSourceSpec"
  userGeneratedQueries = {
    name = "user generated queries"
    schema = {
      fields = [{
        name = "USER"
        dataType = {type = "com.ibm.labbook.ml.spec.schema.StringTypeSpec"
      }{
        name = "ROLE"
        dataType = {type = "com.ibm.labbook.ml.spec.schema.StringTypeSpec"
      }{
        name = "QUERY"
        dataType = {type = "com.ibm.labbook.ml.spec.schema.StringTypeSpec"
      }}]
    }
    query = """
      g.V( ).match(
        __.as("QUERY").has("TYPE", "QUERY").as("QUERY"),
        __.as("QUERY").inE( ).has("RELATION_TYPE",
          "issuedQuery")
          .inV( ).as("USER"),
        __.as("USER").outE( ).has("RELATION_TYPE", "memberOf")
          .outV( ).as("ROLE")).select("USER", "ROLE", "QUERY")
          .values("PREFERRED_LABEL", "PREFERRED_LABEL",
            "QUERY_TEXT")
          .dedup( )
      """
  }
  queries = [${dataSource.userGeneratedQueries}]
}
```

The query may be written using the Gremlin query language. Each query is executed in parallel and the results are gathered to formulate the input dataset. A post query script that binds the graph's connection object can be used to annotate the results from the graph or execute domain specific processing. The post query pipeline can be used to execute Apache Spark specific pipeline stages on the resulting dataset to prepare it for use in training. Once all configured queries have been processed the resulting dataset is handed to a trainer 320 component.

With continued reference to FIG. 3, trainer 320 encapsulates the logic for executing the stages required to generate a trained ML model. To provide flexibility in how the data is used to train models, machine learning framework 300 allows users to specify an optional pre-training phase, a required training phase, and an optional post-training phase. Each of these phases can be implemented using standard Apache Spark pipeline stages. As part of the framework, a transformer 325 is provided that gives the user access to a graph connection and accepts a script written in JavaScript allowing the user to customize how the phase transforms their data. For example, in the snippet below (see TABLE 2) the "transformations" used in this pipeline come from an external module which are included at the beginning of the configuration file.

TABLE 2

Example of Transformations In an ML Pipeline

```
trainer = {
    type = "com.ibm.labbook.ml.spec.training
        .fpm.FrequentPatternMatchingTrainerSpec"
    preTrainingPipeline = {
        stages = [{
            type = "com.ibm.labbook.ml.impl.feature.SqlStatementParser"
            inputCol = "QUERY"
            outputCol = "PARSED_QUERY"
        }{
            specType = "com.ibm.labbook.ml.spec.feature.
            JsonTransformerSpec"
            inputCol = "PARSED_QUERY"
            outputCol = "LABELED_QUERY"
            distinct = true
            transformations = ${transformations}
        }]}
    trainingpipeline = {
        stages = [{
            id = "fpm"
            type = "com.ibm.labbook.ml.impl.feature.fpm.FPGrowthAdapter"
            column = "LABELED_QUERY"
        }]}
}
```

The pre-training phase allows users to execute pipeline stages that transform or modify the dataset to further prepare it for training. In the above example, query data is parsed and transformed into a JSON dataset. Other uses of the pre-training stage include handling of null values and vector assembly among others. The training phase is where a user specifies the ML algorithm they will execute over their dataset. In the above example, frequent pattern growth algorithm (FP-Growth) is executed over the data. Additional examples of ML algorithms that the framework may support include, without limitation: K-Means, Bisecting K-Means, Gaussian Mixture, LDA, and FP-Growth algorithms. The trainer phase additionally supports the ability to determine the best hyper-parameter selection via grid search and designate train/test split ratios. For clustering methods, the Silhouette Coefficient may be used as a basis for model fitness. For FP-Growth, the number of generated patterns may be maximized while minimizing generation time. When executed, machine learning framework 300 may utilize the provided inputs and output the best fit model. Once the training phase has completed, the post-training phase can be used to additionally transform or modify the dataset to prepare it for use in an application or for export. An example-use would be to look up additional attributes for entities from the graph to be used as part of the generated model in an application. For example, the process above could easily be modified to incorporate other contextual metadata, such as a user's role, frequently used datasets, social network etc. It is also possible to push these temporary results back to the graph during this step, allowing other algorithms to leverage these computations.

With continued reference to FIGS. 1 and 3, in order to utilize the information generated in the previous discussion, machine learning framework 300 may support the capability to persist outputs 340, including context graph 100. The user simply declares where they would like their outputs 340 to be persisted and the framework will create or update entities and relationships in the graph. Optionally, results can be persisted to the file system in a directory containing all models and datasets generated in every executed phase. The models may be written to disk in Spark's standard format, so they can be reused elsewhere by loading them via Spark's PipelineModel load method. Persisted datasets can be written using Spark's DataFrameWriter in JSON format and can also be loaded via Spark's DataFrameReader or other methods. The following snippet (see TABLE 3) shows an example of the declarative persistence configuration.

TABLE 3

Sample JavaScript Query code

```
resultPersister = {
    type = "com.ibm.labbook.ml.spec.training.FileBasedResultPersisterSpec"
    format = "json"
    savePath = "./training-outputs"
}
```

EXAMPLES

The two examples provided below make use of context graph 100 and declarative machine learning framework 300; they illustrate how the framework can be adapted to support a variety of persona, such as CDO and DB developer, and use cases, from compliance recommendations to query suggestions.

In the two examples provided, the initial dataset is generated from the SQLShare data release version 1 using data provided by "user 1143". From this dataset, all tables and columns contained in the queries are identified, and a set of DDL statements are constructed to create a database. Using IBM®InfoSphere Metadata Asset Manager version 11.5, the schema information from the database is ingested into IGC, resulting in 33 cataloged tables. Initially, one table named AUTHORED may be held out, as it will be used to illustrate the governance capability. To further enhance the dataset, some of the tables and columns are annotated with business terms defined based on their context. To populate context graph 100, connectors 210 (FIG. 2) are used. The following discussion provides a detailed description of each example.

Contextual Recommendations via Discovery and Compliance—

Figure 4:
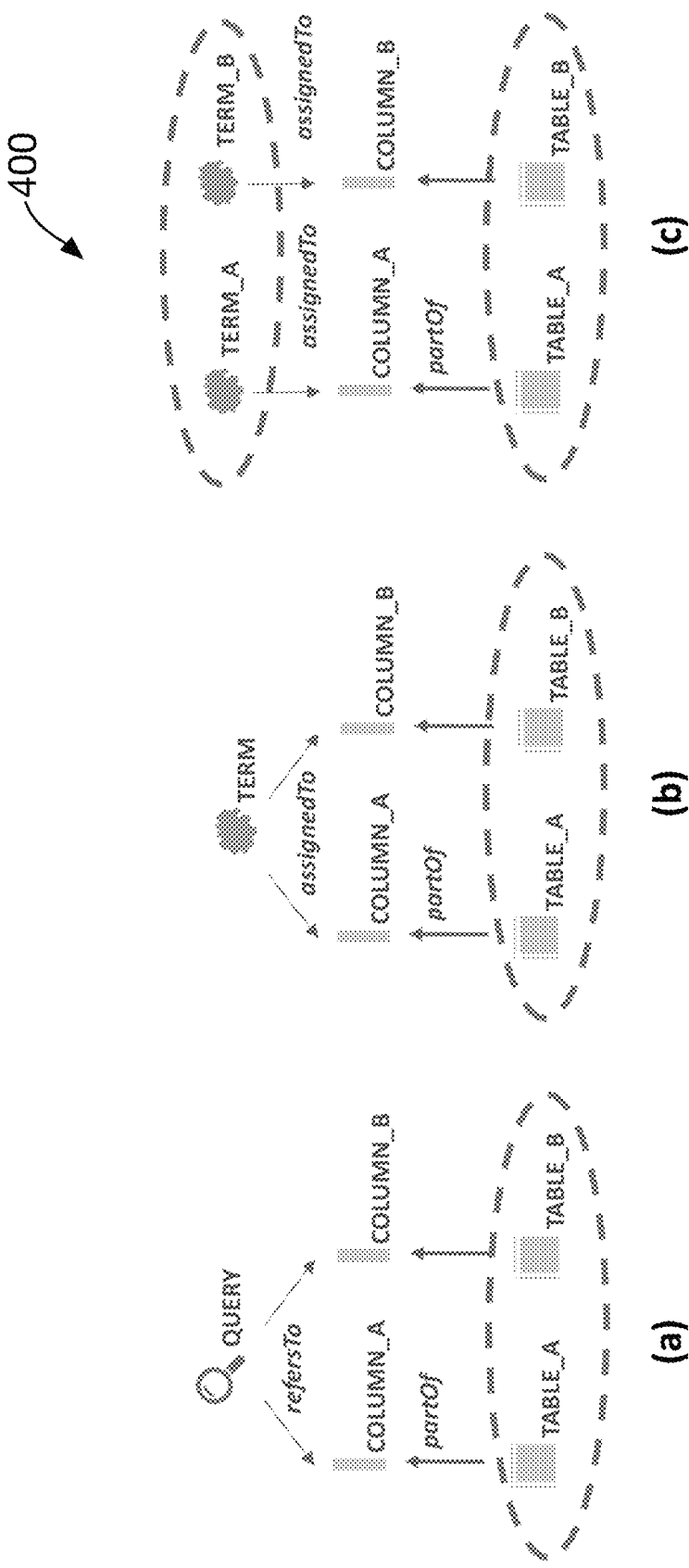
FIG. 4 illustrates an example graph 400 of sampling features to find associations between tables, according to an embodiment of the invention.

In this example, a process is outlined showing how contextual recommendations for discovery and compliance can be made for the CDO by leveraging the connections between tables, columns, and business terms, as show in FIG. 4. FIG. 4 illustrates an example graph 400 of sampling features to find associations between tables, according to an embodiment of the invention.

Referring now to FIGS. 1, 3, and 4, imagine the CDO is reviewing database TABLE_A for compliance within IGC. Additionally, a developer is creating an application where the developer has created a new table TABLE_B to be used with TABLE_A, but TABLE_B is not properly cataloged within IGC. This situation could pose a problem for compliance depending on how the developer uses TABLE_A. Applicant's disclosed invention can assist the CDO in their governance decisions by providing the following capabilities: (1) provide contextual recommendations to other tables sharing similar context to the item viewed; (2) provide information about the number of queries a given table was used in; and (3) provide a warning when a table that has not been cataloged in IGC is used within a query. For this example, shared business terms are used to support item (1).

First, machine learning framework 300 pulls tables and business terms from the graph to formulate a dataset that will be used against the K-Means clustering algorithm. The identified clusters will form the basis for recommendations to other potential tables of interest to the user. By leveraging the model generated in the first example, machine learning framework 300 supplements the clustered table members with their associated frequencies of use within a query. Finally, these two models are used together to determine the assets that are governed by IGC. For those assets that are not governed, a mapping is created between the contextual asset (e.g., TABLE_A) that was used in a query with an ungoverned asset (e.g., TABLE_B) and display this as a recommendation as a possible break in compliance.

FIG. 5 illustrates an example graphical user interface (GUI) 500 for discovery and compliance, according to an embodiment of the invention. More particularly, FIG. 5 shows a modified version of IGC containing a recommendations panel generated from the contextual findings in models generated by Applicant's inventive system. Referring now to FIGS. 1, 3, and 5, the illustrated panel provides the following additional capabilities that are not available in IGC today: (1) recommends related tables based on the context asset (here the context asset is the AUTHOR table); (2) provides a plain, natural language reason as to why a recommendation was made (for this example, the shared context as well as the number of queries the table was used in are communicated); (3) out of compliance recommendations. As mentioned above, in the illustrated example, the AUTHORED table was intentionally held out in order to force a situation where an out of compliance scenario would occur; this scenario is discussed below.

With continued reference to FIGS. 1, 3, and 5, functions of contextual recommendations via discovery from query usage patterns are illustrated using the following example: how contextual recommendations for discovery can be made are illustrated for a database developer by leveraging the connections between users, roles, and the queries they have issued. Imagine a database developer is required to write a query for an application they are developing. However, they are not familiar with the system for which the query will need to operate in. They do have insight into the kind of information required, but being unfamiliar with the system makes the task more difficult to get started. Embodiments of Applicant's invention can aid this developer by generating a model incorporating the contextual metadata of the queries contained in context graph 100.

First, machine learning framework 300 pulls the queries from context graph 100 and parses each into its associated Abstract Syntax Tree (AST) in JSON format. Second, machine learning framework 300 executes a transformation on each AST to generate a set of labeled JSON objects that represent the constituents of the parse tree containing contextual metadata. This metadata may include individual columns, functions, literals, predicates, tables, etc. Additionally, this metadata may contain information about where the object originated within the query (e.g. select, from, where, etc.) including filtering based on data quality and role. For nested objects such as functions and predicates, a labeled object may be generated for each fragment in the tree down to the leaf nodes. This process allows for complex expressions to be broken up and used to generate labeled data at the leaf, subtree, and whole tree levels of these expressions. This labeled set of data is then passed to the training pipeline of the system to determine label frequencies and usage patterns using the FP-Growth algorithm.

FIG. 6 illustrates an example GUI 600 for a query assist function, according to an embodiment of the invention. Referring now to FIG. 6, application is shown that demonstrates how the models generated by embodiments of Applicant's invention can be used for generating query assist recommendations. The application provides two discovery capabilities as the user types their query: (1) most popular items via type ahead as shown in the drop-down list; and (2) recommended next item based on current context and state of the user's input query as shown in the table labeled Recommendations. The application works by dynamically parsing the user's input query and generating a set of labels that can be used to lookup similar usage patterns within the model. If the query cannot be parsed, the application will provide the user with type ahead suggestions to get started. Otherwise, it will provide both type ahead and next item recommendations. The application additionally generates a plain, natural language reason as to why a recommendation was made along with a confidence score which is based on the observed frequency for the labeled items in the user's query.

Figure 7:
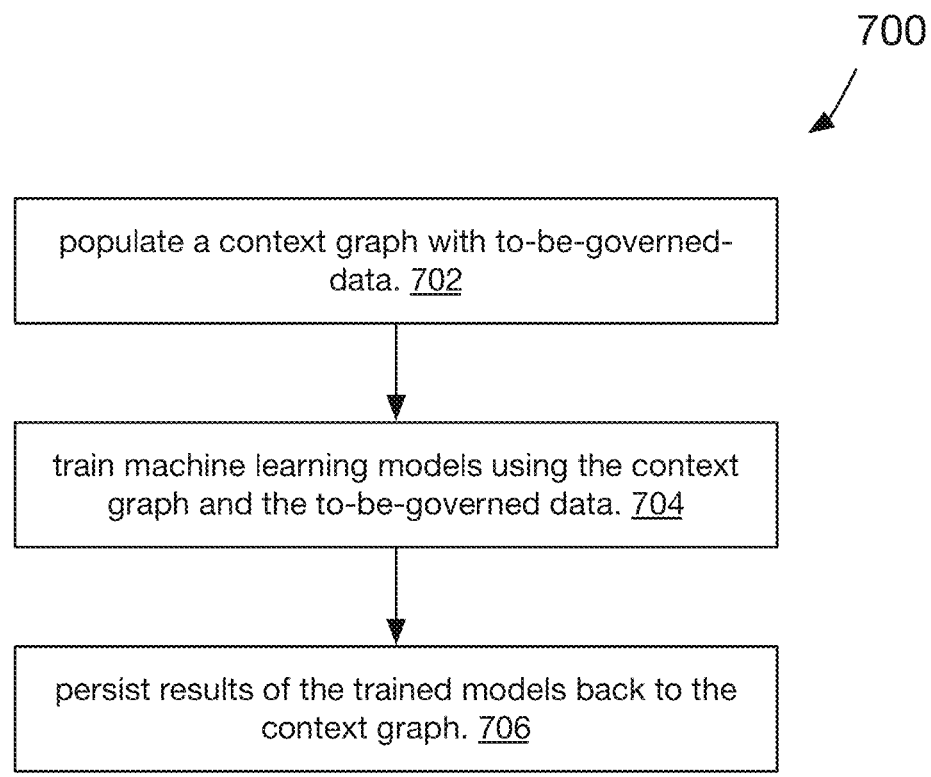
FIG. 7 is a flowchart of a method 600 for providing executing functions of the unified governance structure 200 of FIG. 2 and the machine learning framework 300 of FIG. 3, according to an embodiment of the invention.

FIG. 7 is a flowchart of a method 600 for providing executing functions of the unified governance structure 200 of FIG. 2 and the machine learning framework 300 of FIG. 3, according to an embodiment of the invention. Steps of method 600 may be carried out using programming instructions stored on a tangible storage device for execution by a processor (such as those described in connection with FIG. 8). Referring now to FIGS. 1-3 and 7, machine learning framework 300 populates (step 702) context graph 100 with to-be-governed data, for example from various enterprise application servers 202, 203, 204, 205, 206.

Machine learning framework 300 trains (step 704) one or more models using context graph 100 and the to-be-governed data.

Machine learning framework 300 persists (step 706) results of the trained models back to the context graph.

Figure 8:
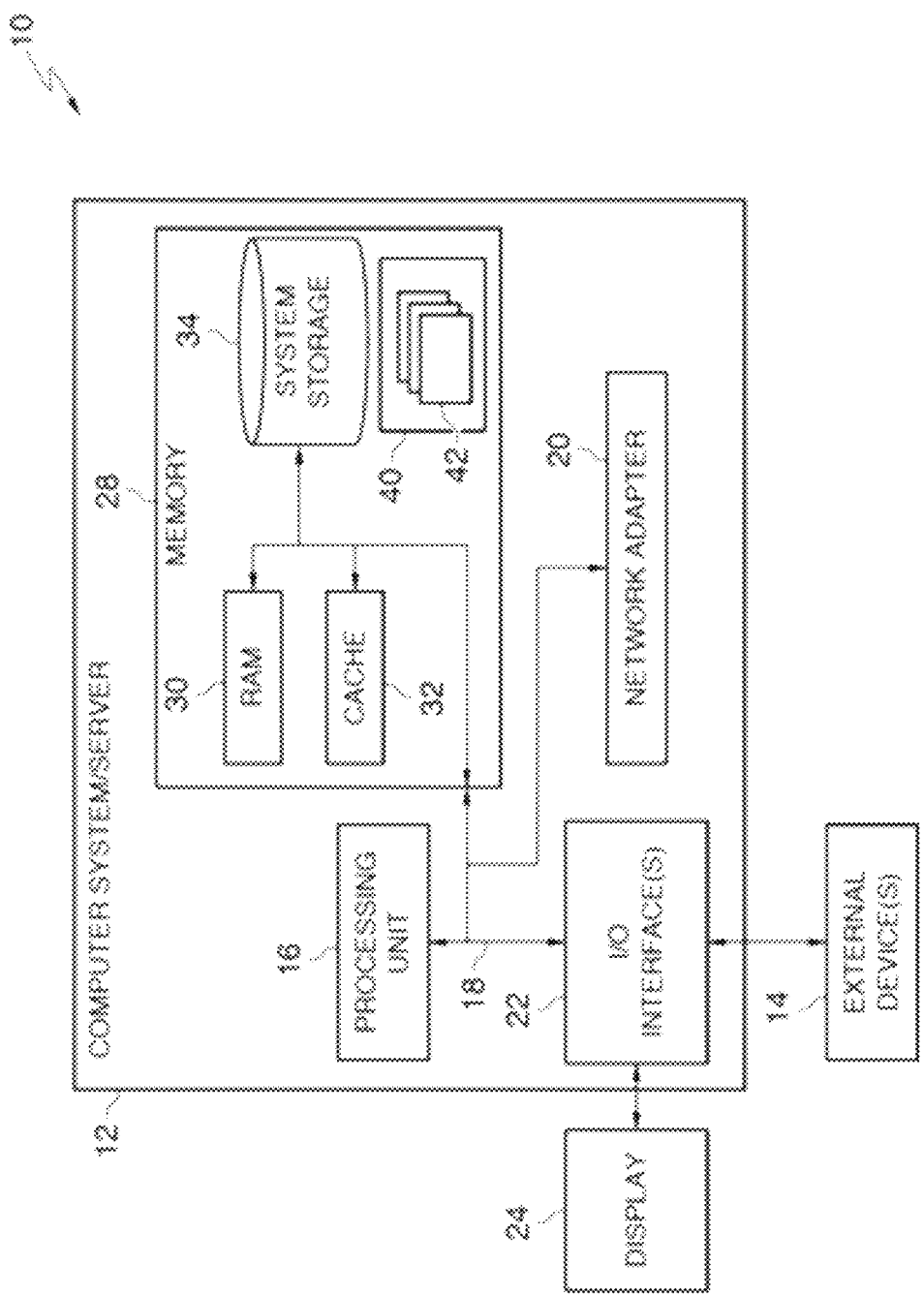
FIG. 8 is a functional block diagram of an exemplary computing device 10, according to an embodiment of the invention, having hardware and software components to implement the various functions described in connection with FIGS. 1-7.

FIG. 8 is a functional block diagram of hardware and software components of unified governance architecture 200 (FIG. 2) and/or machine learning framework 300 (FIG. 3), according to an embodiment of the invention. Referring now to FIG. 8, a schematic of an exemplary computing device (which may be a cloud computing node) is shown, according to an embodiment of the invention. Computing device 10 is only one example of a suitable cloud computing node and is not intended to suggest any limitation as to the scope of use or functionality of embodiments of the invention described herein. Computing device 10 is an example of one or more devices that implement the functions of unified governance architecture 200 (FIG. 2) and/or machine learning framework 300 (FIG. 3).

In computing device 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in computing device 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now generally to embodiments of the present invention, the embodiments may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for unified data governance, comprising:
one or more computer devices each having one or more processors and one or more tangible storage devices; and
a program embodied on at least one of the one or more storage devices, the program having a plurality of program instructions for execution by the one or more processors, the program instructions comprising instructions for:
a machine learning framework in communication with a suite of enterprise application servers via one or more connector components, wherein the machine learning framework populates a context graph with to-be-governed data from the suite of enterprise application servers, trains a plurality of machine learning models based on user-defined parameters, persists properties of the plurality of machine learning models back to the context graph, and displays, via a graphical user interface, a generated recommendations panel based on contextual findings of the plurality of machine learning models, wherein the generated recommendations panel comprises recommended related database tables based on a context asset, natural language reasons as to why particular database tables were recommended, a number of queries a given recommended related database table was used in, and out of compliance recommendations, and wherein a natural language reason provides a shared context comprising a number of terms shared between a recommended related database table and the context asset and a listing of the terms, and wherein an out of compliance recommendation provides a warning when a table, of the recommended related database tables, has not been cataloged and is used within a query, and wherein the context graph comprises a schematic context which describes how data is structured, a semantic context which captures data meaning, a usage context which captures activity on data, a business context which captures practices of a business unit, and a social and organizational context which captures relationships between users comprising users following each other on a social network and organization membership, wherein the machine learning framework provides contextual governance intelligence via implementation of a declarative syntax based on human-optimized config object notation (HOCON) to construct machine learning pipelines.

2. The computer system of claim 1, wherein the context graph comprises one or more contexts each having one or more entities and one or more relations between the entities.

3. The computer system of claim 1, wherein output from the one or more connector components comprises a set of program instructions that update, via a queuing mechanism, the context graph with new entities and new relations.

4. The computer system of claim 1, wherein instructions to train the plurality of machine learning models further comprises:
instructions to specify an optional pre-training phase, a required training phase, and an optional post-training phase.

5. The computer system of claim 4, wherein the optional pre-training phase comprises preparing a dataset for training, and wherein the required training phase comprises specifying a machine-learning algorithm to execute over the dataset, and wherein the optional post-training phase comprises preparing the dataset for use in an application or for export.

6. A computer implemented method for unified data governance, comprising:
populating a context graph with to-be-governed data, by a machine learning framework in communication with a suite of enterprise application servers via one or more connector components, wherein to-be-governed data is retrieved from the suite of enterprise application servers, wherein the context graph comprises a schematic context which describes how data is structured, a semantic context which captures data meaning, a usage context which captures activity on data, a business context which captures practices of a business unit, and a social and organizational context which captures relationships between users comprising users following each other on a social network and organization membership, wherein the machine learning framework provides contextual governance intelligence via implementation of a declarative syntax based on human-optimized config object notation (HOCON) to construct machine learning pipelines;
training a plurality of machine learning models using the context graph and the to-be-governed-data based on user-defined parameters;
persisting properties of the plurality of machine learning models back to the context graph; and
displaying, via a graphical user interface, a generated recommendations panel based on contextual findings of the plurality of machine learning models, wherein the generated recommendations panel comprises recommended related database tables based on a context asset, natural language reasons as to why particular database tables were recommended, a number of queries a given recommended related database table was used in, and out of compliance recommendations, and wherein a natural language reason provides a shared context comprising a number of terms shared between a recommended related database table and the context asset and a listing of the terms, and wherein an out of compliance recommendation provides a warning when a table, of the recommended related database tables, has not been cataloged and is used within a query.

7. The computer implemented method of claim 6, wherein the context graph comprises one or more contexts each having one or more entities and one or more relations between the entities.

8. The computer implemented method of claim 6, wherein output from the one or more connector components comprises a set of instructions that update, via a queuing mechanism, the context graph with new entities and new relations.

9. The computer implemented method of claim 6, wherein training the plurality of machine learning models further comprises:
specifying, by a user, an optional pre-training phase, a required training phase, and an optional post-training phase.

10. The computer implemented method of claim 9, wherein the optional pre-training phase comprises preparing a dataset for training, and wherein the required training phase comprises specifying a machine-learning algorithm to execute over the dataset, and wherein the optional post-training phase comprises preparing the dataset for use in an application or for export.

11. A computer program product for unified data governance, the computer program product comprising a non-transitory tangible storage device having program code embodied therewith, the program code executable by a processor of a computer to perform a method, the method comprising:
populating a context graph with to-be-governed data, by a machine learning framework in communication with a suite of enterprise application servers via one or more connector components, wherein to-be-governed data is retrieved from the suite of enterprise application servers, wherein the context graph comprises a schematic context which describes how data is structured, a semantic context which captures data meaning, a usage context which captures activity on data, a business context which captures practices of a business unit, and a social and organizational context which captures relationships between users comprising users following each other a social network and organization membership, wherein the machine learning framework provides contextual governance intelligence via implementation of a declarative syntax based on human-optimized config object notation (HOCON) to construct machine learning pipelines;
training, by the machine learning framework, a plurality of machine learning models using the to-be-governed-data based on user-defined parameters;
persisting, by the machine learning framework, properties of the plurality of machine learning models back to the context graph; and
displaying, via a graphical user interface, a generated recommendations panel based on contextual findings of the plurality of machine learning models, wherein the generated recommendations panel comprises recommended related database tables based on a context asset, natural language reasons as to why particular database tables were recommended, a number of queries a given recommended related database table was used in, and out of compliance recommendations, and wherein a natural language reason provides a shared context comprising a number of terms shared between a recommended related database table and the context asset and a listing of the terms, and wherein an out of compliance recommendation provides a warning when a table, of the recommended related database tables, has not been cataloged and is used within a query.

12. The computer program product of claim 11, wherein the context graph comprises one or more contexts each having one or more entities and one or more relations between the entities.

13. The computer program product of claim 11, wherein output from the one or more connector components comprises a set of instructions that update, via a queuing mechanism, the context graph with new entities and new relations.

14. The computer program product of claim 11, wherein training the plurality of machine learning models further comprises:
   specifying, by a user, an optional pre-training phase, a required training phase, and an optional post-training phase.

* * * * *